United States Patent [19]

Jameson

[11] Patent Number: 4,474,213
[45] Date of Patent: Oct. 2, 1984

[54] FOLDING SERVICE LINE
[75] Inventor: Neal E. Jameson, Orange, Calif.
[73] Assignee: FMC Corporation, Chicago, Ill.
[21] Appl. No.: 346,448
[22] Filed: Feb. 8, 1982
[51] Int. Cl.³ ............................................. F16L 3/00
[52] U.S. Cl. .................................. 137/615; 141/387; 141/388; 166/75 R; 137/899.3
[58] Field of Search ..................... 137/615, 899, 899.3; 141/387, 388; 166/75 R; 248/49

[56] References Cited

U.S. PATENT DOCUMENTS

| | | | |
|---|---|---|---|
| 3,053,320 | 9/1962 | Steincamp | 166/75 |
| 3,217,748 | 11/1965 | Harper | 137/615 |
| 3,281,080 | 10/1966 | Hogg | 137/615 |
| 3,399,909 | 9/1968 | Ambrose | 137/615 |
| 3,459,222 | 8/1969 | McElroy | 137/615 |
| 3,498,325 | 3/1970 | Ashton et al. | 137/615 |
| 3,721,260 | 3/1973 | Stahmer | 137/615 X |
| 3,730,228 | 5/1973 | Gibbs, Sr. | 248/49 |
| 3,942,554 | 3/1976 | Werner et al. | 137/615 |
| 4,114,662 | 9/1978 | Goodacre et al. | 137/615 |
| 4,130,134 | 12/1978 | Castle | 137/615 |
| 4,142,551 | 3/1979 | Wilms | 137/615 |
| 4,269,239 | 5/1981 | Haley | 137/615 |
| 4,391,297 | 7/1983 | Knight | 137/615 |

Primary Examiner—A. Michael Chambers
Attorney, Agent, or Firm—Lloyd B. Guernsey; Henry M. Stanley; Richard B. Megley

[57] ABSTRACT

A folding boom assembly supported articulated well service pipeline for the transfer of pressurized fluids from service vehicles to petroleum wellheads for the treatment and stimulation of production oil wells. The boom assembly is mounted on a truck, trailer or other suitable mobile support and the articulated pipeline comprises a plurality of long straight pipe sections interconnected by a plurality of pipe elbows and by swivel joints. Each of the pipe sections is supported by a corresponding boom section aligned generally parallel to the pipe section. The boom sections and their corresponding pipe sections are folded onto the service vehicle for transportation and are extended for connection to a wellhead. Supports between the ground and the boom sections reduce the loads transmitted to the service vehicle and allow the use of lighter and less costly boom assemblies.

8 Claims, 7 Drawing Figures

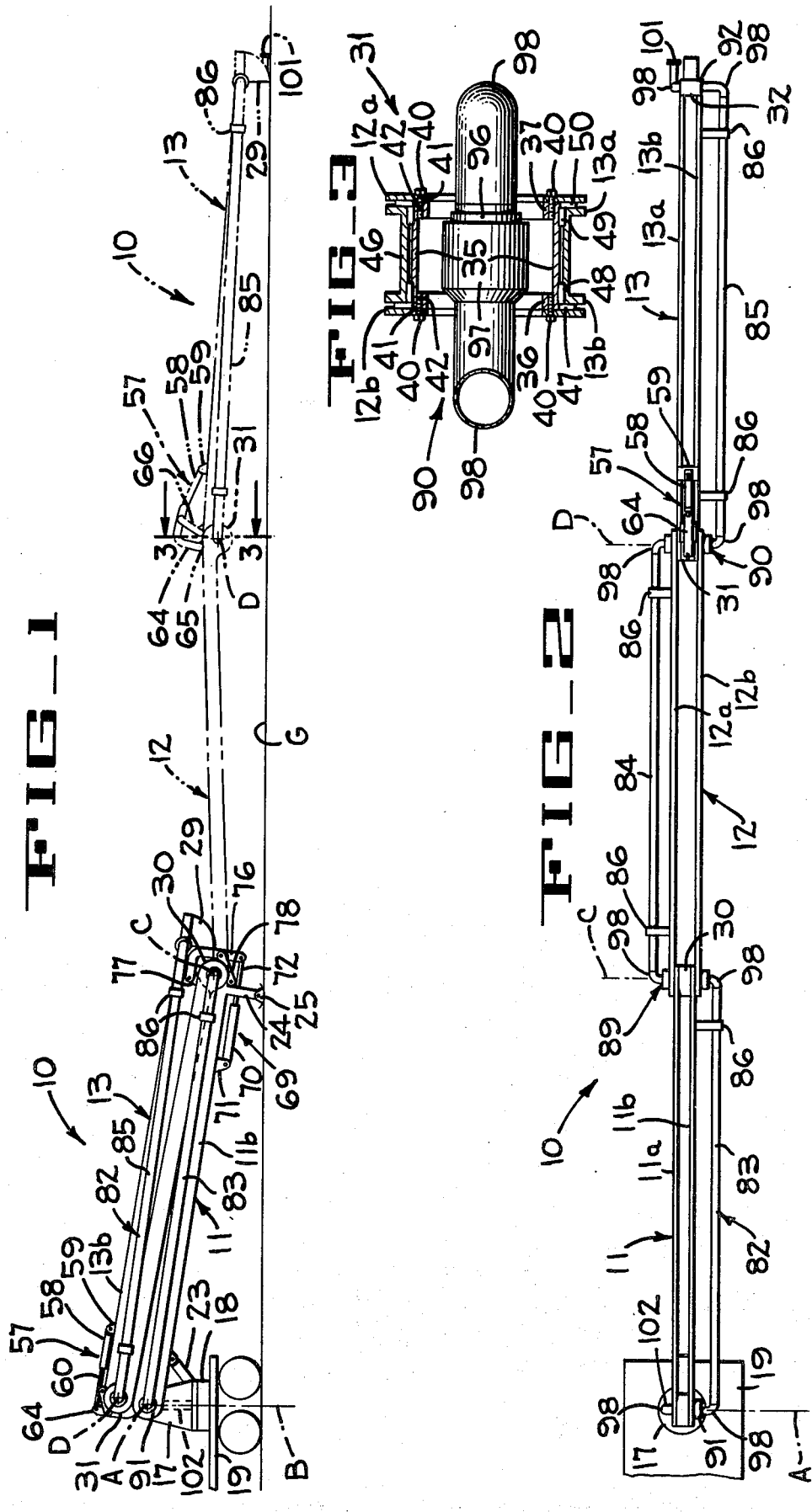

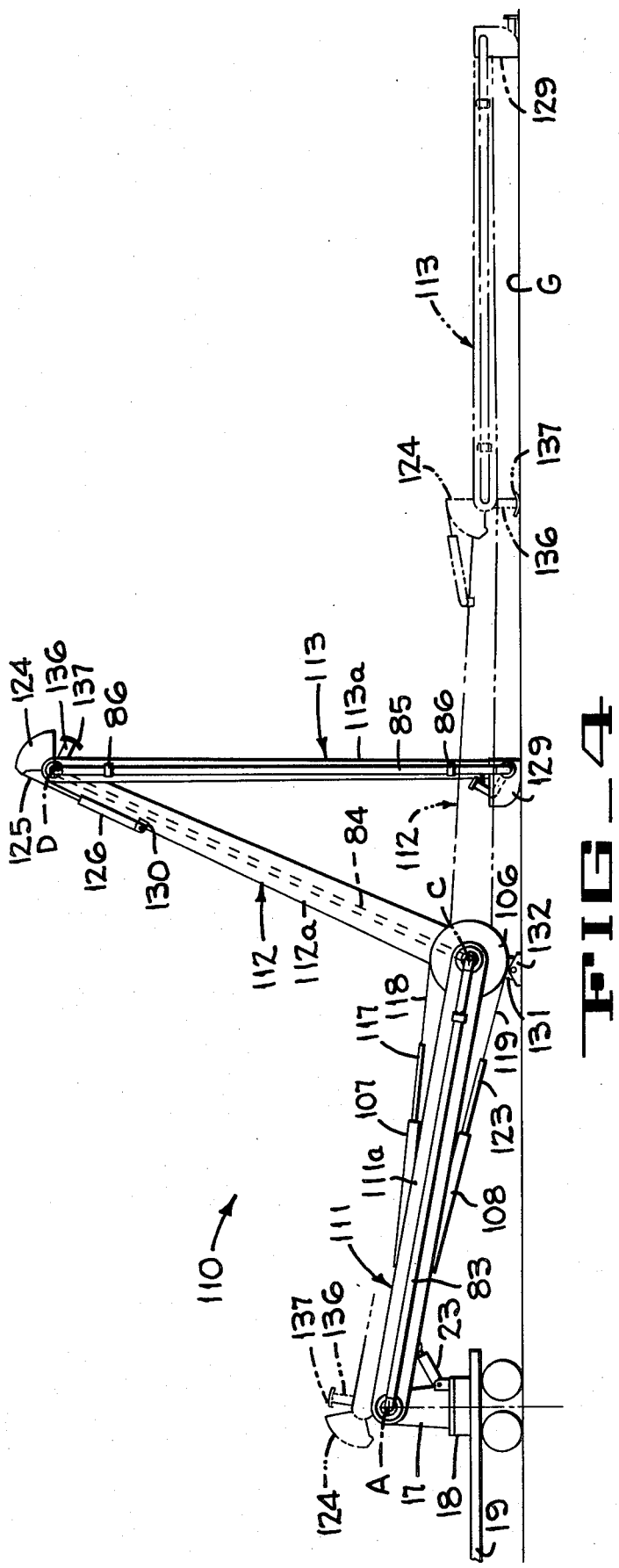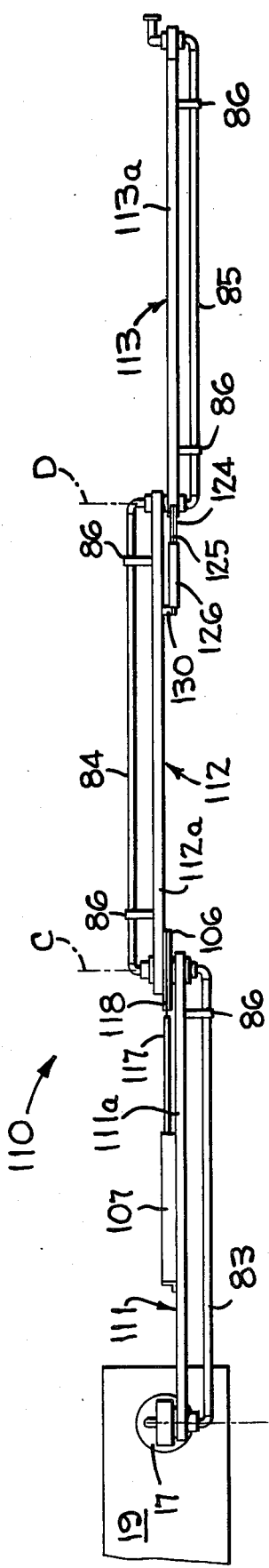

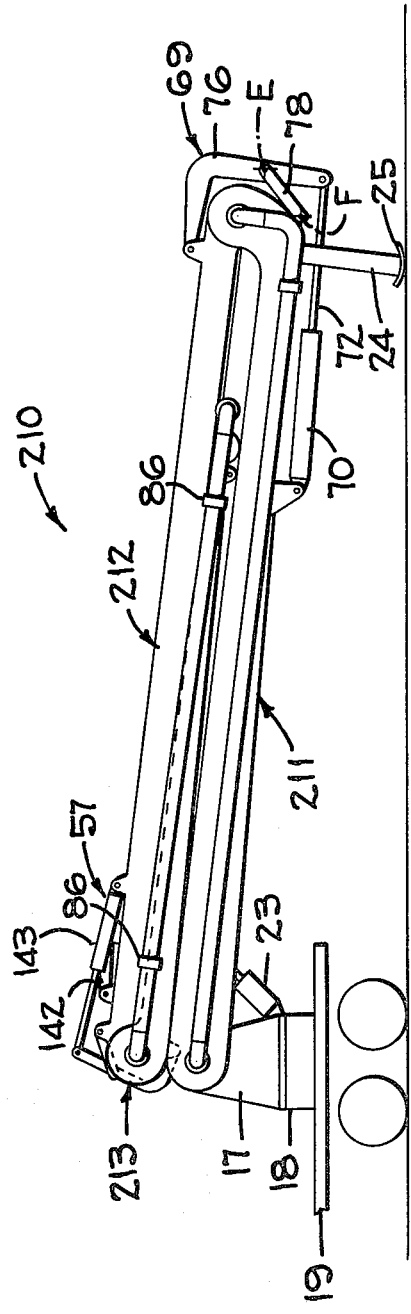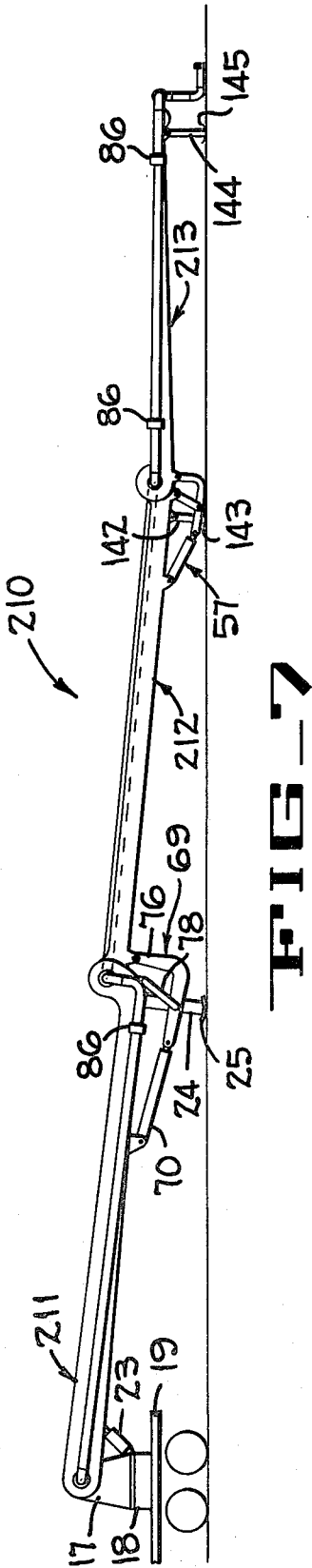

FOLDING SERVICE LINE

BACKGROUND OF THE INVENTION

1. Field of the Invention

This invention relates to well servicing equipment, and more particularly, to apparatus for conducting pressurized fluids from a service vehicle to a wellhead.

2. Description of the Prior Art

During the course of producing fluids from a petroleum well it is often desirable or necessary to subject the well to a treatment procedure in order to stimulate its fluid production. This procedure usually involves the injection of fluids under high pressure, such as 20,000 psi, to facture the producing earth formation, or the injection of an acid solution to dissolve or otherwise remove flow obstructing material, thereby increasing the flow of petroleum from the formation into the well. In order to carry out these well stimulation procedures, it is commonplace to employ an articulated pipe assembly, called a service line, to conduct the fluid from a pump system to the wellhead. Such a service line usually comprises a plurality of straight links of rigid pipe interconnected end-to-end by pipe swivel joints, and sufficient pipe unions to facilitate disassembly into sections that can be handled manually.

Where pipe of larger than normal diameter and thus of greater weight is used in order to increase the volume of fluid injected into the well at a given time period, or to reduce the time for injecting a given fluid volume, additional personnel and/or time are required to unload the service line sections from their transport, assemble them and connect the line to the wellhead and then disassemble the line and reload the sections upon completion of fluid injection. Another disadvantage of a conventional service line is that it rests unrestrained on the ground between the transport and the wellhead and thus is free to whip about and possibly injure personnel or equipment if it breaks under pressure. Fluid flowing through the service line causes the line to vibrate so the line may sink into any ground that is muddy or soft. It is also known to employ an articulated well service pipeline mounted on and supported at all times by a mobile telescoping boom assembly that can be extended from its transport base to carry the service line to a wellhead for connection thereto and for retracting the service pipeline for transport from one location to another. This articulated pipeline may include a relatively large number of fairly short sections of pipe interconnected by a plurality of elbows and swivel joints that extend from and retract into their rest or stowed position in an accordion-like manner. Such accordion-type service lines are relatively expensive to build and it is difficult to drain fluid from these lines because the elbows and pipe joints are below other portions of the service line.

SUMMARY OF THE INVENTION

The present invention eliminates some of the disadvantages of the prior art by using a folding boom assembly to support an articulated service pipeline. The boom assembly includes a plurality of boom sections pivotally connected in an end-to-end manner with boom supports each connected to the outer end of a corresponding one of the boom sections and with the inner end of the boom assembly connected to a transport vehicle. The articulated service line includes a plurality of pipe sections each supportively connected to a corresponding one of the boom sections. The boom supports hold the boom sections above ground and allow the boom sections to be made of lighter and less expensive material than would be required if the boom assembly were supported only at the inner end. A plurality of hydraulic cylinders move the boom assembly and the service line between a stowed position and an extended position.

BRIEF DESCRIPTION OF THE DRAWINGS

FIG. 1 is a side elevation of one embodiment of the folding service line of the present invention with the solid line showing the service line in a fully retracted position and with the dashed lines showing the service line in a fully extended position.

FIG. 2 is a plan view of the embodiment of FIG. 1 showing the service line in a fully extended position.

FIG. 3 is an enlarged partial section taken along the line 3—3 of FIG. 1 showing details of the joints between adjacent sections of the folding service line of FIG. 1.

FIG. 4 is a side elevation of another embodiment of the folding service line of the present invention with the solid line showing the service line in a partially extended position and with the dashed lines showing the service line in a fully extended position.

FIG. 5 is a plan view of the folding service line of FIG. 4 showing the service line in a fully extended position.

FIG. 6 is a side elevation of another embodiment of the folding service line of the present invention with the service line shown in a stowed position.

FIG. 7 is a side elevation of the service line of FIG. 6 with the service line in a fully extended position.

DESCRIPTION OF THE PREFERRED EMBODIMENT

The folding service line disclosed in FIGS. 1 and 2 includes an articulated boom assembly 10 having a plurality of boom sections 11–13 pivotally interconnected in an end-to-end manner. The inboard end of the inner boom section 11 is pivotally connected to a turret 17 for movement about a horizontal axis A. The turret 17 is rotatably mounted on a pedestal 18 for movement about a vertical axis B and the pedestal 18 is secured to a transportable chassis 19 for transportation to and from a work site. The inboard end of the intermediate boom section 12 is pivotally connected to the outboard end of the inner boom section 11 for pivotal movement about a horizontal axis C and the inboard end of the outer boom section 13 is connected to the boom section 12 for pivotal movement about a horizontal axis D.

A hydraulic elevating cylinder 23 connected between the turret 17 and the inner boom section 11 pivots the boom 10 upward about the horizontal axis A to a generally horizontal position for transportation on the chassis 19, or lowers the boom 10 into an oriented position shown in FIG. 1. In the oriented position a support pod 24 and a foot 25 support the outer end of the inner boom 11 so the boom 10 can be unfolded into the work position shown in the dashed lines of FIG. 1 with an outer support 29 resting on the ground G to support the outer end of the boom section 13.

Each of the boom sections 11–13 comprises a pair of generally parallel boom members 11a, 11b; 12a, 12b; 13a, 13b (FIG. 2) pivotally interconnected by a pair of boom joints 30, 31 (FIGS. 1–3). The boom joints (FIG. 3) each includes an inner cylindrical sleeve 35 having a pair of radially inward flanges 36, 37 at the end thereof and with the sleeve 35 of joint 31 (FIGS. 2, 3) connected to the boom members 12a, 12b by a plurality of capscrews 40 each extending through a bore 41 in one of the boom members 12a, 12b into a threaded bore 42 in one of the flanges 36, 37. An outer cylindrical sleeve 46 of joint 31 is rotatably mounted around the inner sleeve 35 by a plurality of bearings 47-50 and the sleeve 46 is welded or otherwise connected to the outer boom members 13a, 13b. The boom joint 30 is similarly constructed to interconnect the boom sections 11, 12.

The outer boom section 13 is moved from the folded position shown in the solid lines in FIG. 1 into the extended position shown in the dashed lines of FIG. 1 by power apparatus 57 comprising a hydraulic cylinder 58 pivotally connected to an ear 59 on the boom section 13 and having a cylinder rod 60 connected to a L-shaped lever 64 which in turn is pivotally connected to an ear 65 on the intermediate boom section 12. A lever arm 66 is pivotally connected between the boom section 12, and the L-shaped lever 64. Similar apparatus for folding and extending boom sections is shown in more detail in the embodiment of the invention shown in FIGS. 6, 7 and this apparatus will be described in more detail hereinafter. Another power apparatus 69 comprising a hydraulic cylinder 70 pivotally connected to an ear 71 on the inner boom section 11 and having a hydraulic rod 72 pivotally connected to an L-shaped lever 76 folds and extends the intermediate boom section 12 relative to the inner boom section 11. The L-shaped lever 76 is pivotally connected to an ear 77 on the intermediate boom 12 and the lever arm 78 is connected between the inner boom section 11 and the L-shaped lever 76.

An articulated service line 82 (FIGS. 1, 2) having a plurality of pipe sections 83-85 is supported by the boom assembly 11 and folds and extends along with the boom assembly. Each of the pipe sections 83-85 is mounted for support to a corresponding one of the boom sections 11-13 by one or more mounting brackets 86. The pipe sections 83-85 are connected by a plurality of pipe swivel joints 89, 90 and are connected to an input swivel joint 91 and to an output swivel joint 92. Each of the swivel joints 89-92 (FIGS. 2, 3) includes an inner joint member 96 and an outer joint member 97 rotatably surrounding the inner joint member. Each of the pipe swivel joints 89, 90 is mounted inside a corresponding one of the boom joints 30, 31 with the pipe joint "floating" inside the corresponding boom joint to accommodate any expansion or contraction of the pipe sections relative to the boom sections. The outer pipe swivel joint 92 is similarly mounted in a boom joint 32 at an outboard end of the boom section 13. The inner and outer joints are each connected to at least one of the pipe sections 83-85 by one or more pipe elbows 98. A connector pipe 101 is connected to the outer pipe swivel joint 92 by a pipe elbow 98 and the inner pipe swivel joint 91 is connected to a vertical inlet pipe 102 (FIGS. 1, 2) by another pipe elbow 98.

Another embodiment of the folding service line disclosed in FIGS. 4 and 5 includes an articulated boom assembly 110 having a plurality of boom sections 111-113 pivotally interconnected in an end-to-end manner. Each of the boom sections 111-113 includes a single boom member 111a-113a rather than the parallel pair of boom members disclosed in FIGS. 1-3. The inward end of the intermediate member 112a is fixed to a sheave 106 for pivotal movement about the horizontal axis C and the boom member 112a is raised and lowered by a pair of hydraulic cylinders 107, 108. The cylinders 107, 108 are mounted on the inner boom member 111a and a hydraulic rod 117 of the cylinder 107 is connected to the sheave 106 by a cable 118. A cable 119 is connected between the sheave 106 and a hydraulic rod 123 of the cylinder 108. Contraction of the rod 117 into the cylinder 107 and extension of the rod 123 from the cylinder 108 causes the sheave 106 and the boom section 112 (FIG. 4) to rotate counterclockwise about the horizontal axis C. The inboard end of the outer boom member 113 is fixed to a cam 124 for pivotal movement of the outer boom member about the horizontal axis D. A cable 125 is connected between the cam 124 and the hydraulic cylinder 126. The cylinder 126 is pivotally connected to an ear 130 on the inner boom section 112. When the cable 125 is retracted toward the cylinder 126 the cam 124 and the outer boom member 113 rotate counterclockwise from the solid line position in FIG. 4 into a horizontal position shown in the dashed lines in FIG. 4. When the intermediate boom section 112 is rotated clockwise the boom is moved into the dashed line position shown in FIG. 4 with the outer end of the boom section 111 supported above ground by a pod 131 and a foot 132. The outer end of the boom section 112 is supported by a pod 136 and a foot 137, and the outer end of the section 113 is supported by an outer support 129. The service line of FIGS. 4 and 5 can be connected to a wellhead and operated with the outer support 129 at any one of a plurality of positions between the solid line position shown in FIG. 4 and the dashed line position shown in FIG. 4. Thus, the distance between the truck chassis 19 and the wellhead is not critical and the truck chassis 19 can be readily positioned in a working position adjacent a wellhead and the boom assembly extended to reach the wellhead.

A third embodiment of the present invention disclosed in FIGS. 6 and 7 is similar to the embodiment disclosed in FIGS. 1 and 2 except the outer boom section 213 is folded into a position between the inner boom section 211 and the intermediate boom section 212 when the boom assembly 210 is in the stowed position shown in FIG. 6. In order to fold the boom section 213 as shown, the power apparatus 57 is mounted on the underside of the extended boom section 212 (FIG. 7) as opposed to the mounting disclosed in the dashed lines of FIG. 1. The power apparatus 69 for folding and extending the intermediate boom section 212 is mounted in the manner described in the embodiment of FIGS. 1 and 2. When the cylinder 70 is contracted the rod 72 causes the L-shaped lever 76 to pivot about a horizontal axis E and causes the lever 78 to pivot about a horizontal axis F to extend the intermediate boom section 212 from the stowed position of FIG. 6 toward the extended position of FIG. 7. The outer ends of the boom sections 211, 212, 213 are each supported at the outer end by the pods 24, 142, 144 and the corresponding feet 25, 143 and 145.

The present invention includes a folding boom assembly which supports an articulated well service pipeline having a plurality of long straight pipe sections interconnected by pipe elbows and swivel joints. Each of the pipe sections is supported by a corresponding boom section. The boom assembly and the service pipeline are folded onto a service vehicle for transportation and are extended for connection to a wellhead. Supports between the ground and the boom sections reduce the loads transmitted to the service vehicle so lighter boom assemblies can be used.

Although the best mode contemplated for carrying out the present invention has been herein shown and described, it will be apparent that modification and variation may be made without departing from what is regarded to be the subject matter of the invention.

What is claimed is:

1. A boom supported folding service line for use in well service operations to interconnect a supply of pressurized fluid to a wellhead comprising:
   an articulated boom assembly having a plurality of boom sections;
   an articulated pipe service line having a plurality of pipe sections;
   means for supportively connecting each of said boom sections to a corresponding one of said pipe sections;
   a plurality of boom section supports each having a foot for resting on the ground;
   means for connecting each of said boom section supports to an outer end of a corresponding one of said boom sections so said foot rests on the ground to support said outer end of the corresponding boom section when said boom assembly is at least partially extended;
   means for moving said boom assembly and said service line from a stowed position to an extended position by first lowering the outer end of an inner boom section until a boom section support is positioned between ground and the outer end of said inner boom section;
   means for then pivotally moving an intermediate boom section until a boom section support is positioned between ground and the outer end of the intermediate boom section; and
   means for next pivotally moving an outer boom section until a boom section support is positioned between ground and the outer end of the outer boom section.

2. A boom supported service line for use in well service operations to interconnect a supply of pressurized fluid to a wellhead comprising:
   an articulated boom assembly having a plurality of boom sections;
   an articulated pipe service line having a plurality of pipe sections;
   means for supportively connecting each of said boom sections to a corresponding one of said pipe sections;
   a plurality of boom section supports each having a foot for resting on the ground;
   means for connecting each of said boom section supports to an outer end of a corresponding one of said boom sections so said foot rests on the ground to support said outer end of the corresponding boom section when said boom assembly is at least partially extended;
   means for moving said boom assembly and said service line from a stowed position to an extended position by first lowering the outer end of an inner boom section until a boom section support is positioned between ground and the outer end of said inner boom section; and
   means for then pivotally moving an intermediate boom section about the outer end of said inner boom section and pivotally moving an outer boom section about the outer end of said intermediate boom section until a boom section support is positioned between ground and the outer end of said outer boom section.

3. A boom supported service line as defined in claim 2 wherein said means for moving said boom assembly includes a sheave rotatably connected to an outer end of a first boom section and fixed to an inner end of a second boom section, a pair of hydraulic cylinders each having an extendable rod, means for connecting each of said hydraulic cylinders to said first boom section, a pair of cables, means for connecting each of said cables between said sheave and a corresponding one of said extendable rods to pivotally move said second boom section about said outer end of said first boom section as said first and said second rods are extended and retracted.

4. A boom supported service line as defined in claim 3 wherein said hydraulic cylinder rods can be partially extended to move said service line into a partially extended position.

5. A boom supported service line as defined in claim 2 wherein further pivotal movement of said outer boom section and of said intermediate boom section positions a boom support between ground and the outer end of said intermediate boom section.

6. A boom supported service line as defined in claim 2 including a plurality of hollow boom joints, with a corresponding one of said boom joints connected at each end of each of said boom sections, and wherein said means for connecting each of said boom sections to a corresponding pipe section includes means for floating said pipe line through said hollow joints with no pipe support inside said hollow joints.

7. A boom supported service line as defined in claim 2 wherein said means for moving said boom assembly includes a cam rotatably connected to an outer end of a first boom section and fixed to an inner end of a second boom section, a hydraulic cylinder having an extendable rod, means for connecting said hydraulic cylinder to said first boom section, a cable, means for connecting said cable between said cam and said extendable rod to pivotally move said second boom section in a first direction when said rod is retracted and gravity pivotally moves said second boom section in a second direction when said rod is extended.

8. A boom supported service line as defined in claim 2 including a plurality of boom joints, each of said boom joints comprising: an inner cylindrical sleeve, means for connecting said inner sleeve to an outer end of a first boom section, an outer cylindrical sleeve, means for connecting said outer sleeve to an inner end of a second boom section and means for rotatably mounting said outer sleeve around said inner sleeve.

* * * * *